United States Patent
Mori et al.

(10) Patent No.: US 10,282,887 B2
(45) Date of Patent: May 7, 2019

(54) INFORMATION PROCESSING APPARATUS, MOVING IMAGE REPRODUCTION METHOD, AND COMPUTER READABLE MEDIUM FOR GENERATING DISPLAY OBJECT INFORMATION USING DIFFERENCE INFORMATION BETWEEN IMAGE FRAMES

(71) Applicant: Mitsubishi Electric Corporation, Tokyo (JP)

(72) Inventors: Kentaro Mori, Tokyo (JP); Atsushi Hori, Tokyo (JP); Hiroyasu Negishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 32 days.

(21) Appl. No.: 15/521,756

(22) PCT Filed: Dec. 12, 2014

(86) PCT No.: PCT/JP2014/083008
§ 371 (c)(1),
(2) Date: Apr. 25, 2017

(87) PCT Pub. No.: WO2016/092704
PCT Pub. Date: Jun. 16, 2016

(65) Prior Publication Data
US 2017/0249770 A1  Aug. 31, 2017

(51) Int. Cl.
*G06T 13/00* (2011.01)
*G06T 13/80* (2011.01)
(Continued)

(52) U.S. Cl.
CPC .......... *G06T 13/80* (2013.01); *G06K 9/00744* (2013.01); *G06K 9/6215* (2013.01);
(Continued)

(58) Field of Classification Search
None
See application file for complete search history.

(56) References Cited

U.S. PATENT DOCUMENTS 6,628,890 B1  9/2003 Yamamoto et al.
6,690,376 B1 * 2/2004 Saito ...................... A63F 13/10
345/473

(Continued)

FOREIGN PATENT DOCUMENTS

JP  7-78061 A  3/1995
JP  2000-148131 A  5/2000

(Continued)

*Primary Examiner* — Phong X Nguyen
(74) *Attorney, Agent, or Firm* — Birch, Stewart, Kolasch & Birch, LLP

(57) ABSTRACT

A moving image reproduction unit (104) generates display object information for each of a plurality of frames, using difference information for each object associated with each frame and reproduces a moving image. An analysis unit (102) analyzes the difference information for each frame and determines a frame attribute that is an attribute of the frame. When a frame other than a head frame of the plurality of frames is specified as a reproduction start frame from which the reproduction of the moving image starts, the moving image reproduction unit (104) extracts one of the plurality of frames based on the frame attribute determined by the analysis unit (104). Further, the moving image reproduction unit (104) generates display object information of the reproduction start frame, using the difference information of the frame extracted and the difference information of the reproduction start frame, and starts the reproduction of the moving image from the reproduction start frame.

16 Claims, 13 Drawing Sheets

(51) Int. Cl.
    *H04N 5/93*    (2006.01)
    *G06K 9/00*    (2006.01)
    *G06K 9/62*    (2006.01)
    *G06T 1/20*    (2006.01)
    *G11B 27/00*   (2006.01)

(52) U.S. Cl.
    CPC ............... *G06T 1/20* (2013.01); *G11B 27/00* (2013.01); *H04N 5/93* (2013.01)

(56) References Cited

U.S. PATENT DOCUMENTS

| | | | |
|---|---|---|---|
| 2003/0112244 A1 | 6/2003 | Matsuyama | |
| 2003/0164847 A1* | 9/2003 | Zaima | G06T 13/00 |
| | | | 715/723 |
| 2005/0141861 A1* | 6/2005 | Dunbar | H04N 5/783 |
| | | | 386/344 |
| 2007/0263982 A1 | 11/2007 | Hasegawa et al. | |
| 2008/0183843 A1* | 7/2008 | Gavin | G06Q 30/06 |
| | | | 709/217 |
| 2011/0157196 A1* | 6/2011 | Nave | G06T 15/005 |
| | | | 345/522 |
| 2013/0009965 A1* | 1/2013 | Kato | G06T 13/80 |
| | | | 345/474 |
| 2013/0038613 A1* | 2/2013 | Kim | H04M 1/72555 |
| | | | 345/473 |
| 2013/0120439 A1* | 5/2013 | Harris | G11B 27/034 |
| | | | 345/619 |
| 2014/0267350 A1* | 9/2014 | Kass | G09G 5/393 |
| | | | 345/589 |
| 2015/0242988 A1* | 8/2015 | Bolz | G06T 1/20 |
| | | | 345/628 |
| 2015/0304573 A1* | 10/2015 | Yamada | H04N 5/262 |
| | | | 348/578 |

FOREIGN PATENT DOCUMENTS

| | | |
|---|---|---|
| JP | 2000-224543 A | 8/2000 |
| JP | 2001-344613 A | 12/2001 |
| JP | 2006-107132 A | 4/2006 |
| JP | 4362480 B2 | 11/2009 |
| JP | 5323251 B2 | 10/2013 |

* cited by examiner

Fig. 5

| COMMAND NAME | DESCRIPTION |
|---|---|
| ADD | ADD OBJECT |
| MOD | CHANGE PARAMETER OF OBJECT |
| DEL | DELETE OBJECT |
| SWP | FINISH FRAME |
| END | FINISH ANIMATION |

INFORMATION PROCESSING APPARATUS, MOVING IMAGE REPRODUCTION METHOD, AND COMPUTER READABLE MEDIUM FOR GENERATING DISPLAY OBJECT INFORMATION USING DIFFERENCE INFORMATION BETWEEN IMAGE FRAMES

TECHNICAL FIELD

The present invention relates to reproduction of moving image data in which display contents of each frame are constituted from a combination of objects.

An object is a drawing unit in the moving image data, and is each image or each figure constituting a screen.

Hereinafter, animation data will be described, as an example of the moving image data constituted from the combination of objects.

BACKGROUND ART

In a conventional animation display apparatus, animation data has been constituted, using difference information from an immediately preceding frame for each object, thereby reducing a data size (e.g., Patent Literature 1).

Generally, such animation data is constituted from basic frame data and difference frame data.

The basic frame data is data including all information necessary for constructing display object information.

The display object information is information on one or more objects to be displayed in one frame, and is information in which drawing attributes of the one or more objects such as the types, the numbers, the positions, the sizes, and the colors of the one or more objects to be displayed are defined, for each frame.

The difference frame data is difference information from an immediately preceding frame, for each object.

There is disclosed a method of disposing a plurality of pieces of these basic frame data in animation data, thereby speeding up construction of display object information in an arbitrary frame (e.g., Patent Literature 2).

There is also disclosed a method of generating difference frame data of former and latter frames at a time of animation reproduction, thereby achieving data amount reduction and speeding up of drawing even if a frame display order is not fixed (e.g., Patent Literature 3)

CITATION LIST

Patent Literature
  Patent Literature 1: JP 5323251
  Patent Literature 2: JP 4362480
  Patent Literature 3: JP 2000-148131A

SUMMARY OF INVENTION

Technical Problem

With the conventional animation display apparatus, the data size of the animation data is reduced by using the basic frame data and the difference frame data.

However, there has been a problem that it is necessary to hold a plurality of pieces of the basic frame data in the animation data in order to speed up construction of the display object information of an arbitrary frame, so that the data size correspondingly increases.

There is also proposed the method of generating the difference frame data at the time of animation reproduction, thereby speeding up drawing of an arbitrary frame while reducing a data amount.

Even with this method, however, there is also a problem that a burden on a CPU (Central Processing Unit) at a time of generation of the difference frame data is large and the size of original data necessary for generating the difference frame data is large.

A main object of the present invention is to solve the problems as mentioned above. It is the main object to reduce a data amount of moving image data constituted from a combination of objects and speed up construction of the display object information of a reproduction start frame from which a reproduction of the moving image data starts.
Solution to Problem An information processing apparatus according to the present invention may include:

a moving image reproduction unit to generate display object information for each of a plurality of frames, using difference information for each object associated with each frame and to reproduce a moving image; and an analysis unit to analyze the difference information for each frame and to determine a frame attribute that is an attribute of the frame;

wherein when a frame other than a head frame of the plurality of frames is specified as a reproduction start frame from which a reproduction of the moving image starts, the moving image reproduction unit extracts one of the plurality of frames based on the frame attribute determined by the analysis unit, generates the display object information of the reproduction start frame, using the difference information of the frame extracted and the difference information of the reproduction start frame, and starts the reproduction of the moving image from the reproduction start frame.
Advantageous Effects of the Invention In the present invention, the display object information of the reproduction start frame is generated, using the difference information of the frame extracted and the difference information of the reproduction start frame.

Therefore, the display object information of the reproduction start frame can be generated, using a small data amount, so that data amount reduction of moving image data and speeding up of construction of the display object information of the reproduction start frame can be achieved.

BRIEF DESCRIPTION OF DRAWINGS

FIG. 5 is a table illustrating an example of each command constituting difference information according to Embodiment 2.

DESCRIPTION OF EMBODIMENTS

Embodiment 1

*Description of Configuration*

Figure 1:
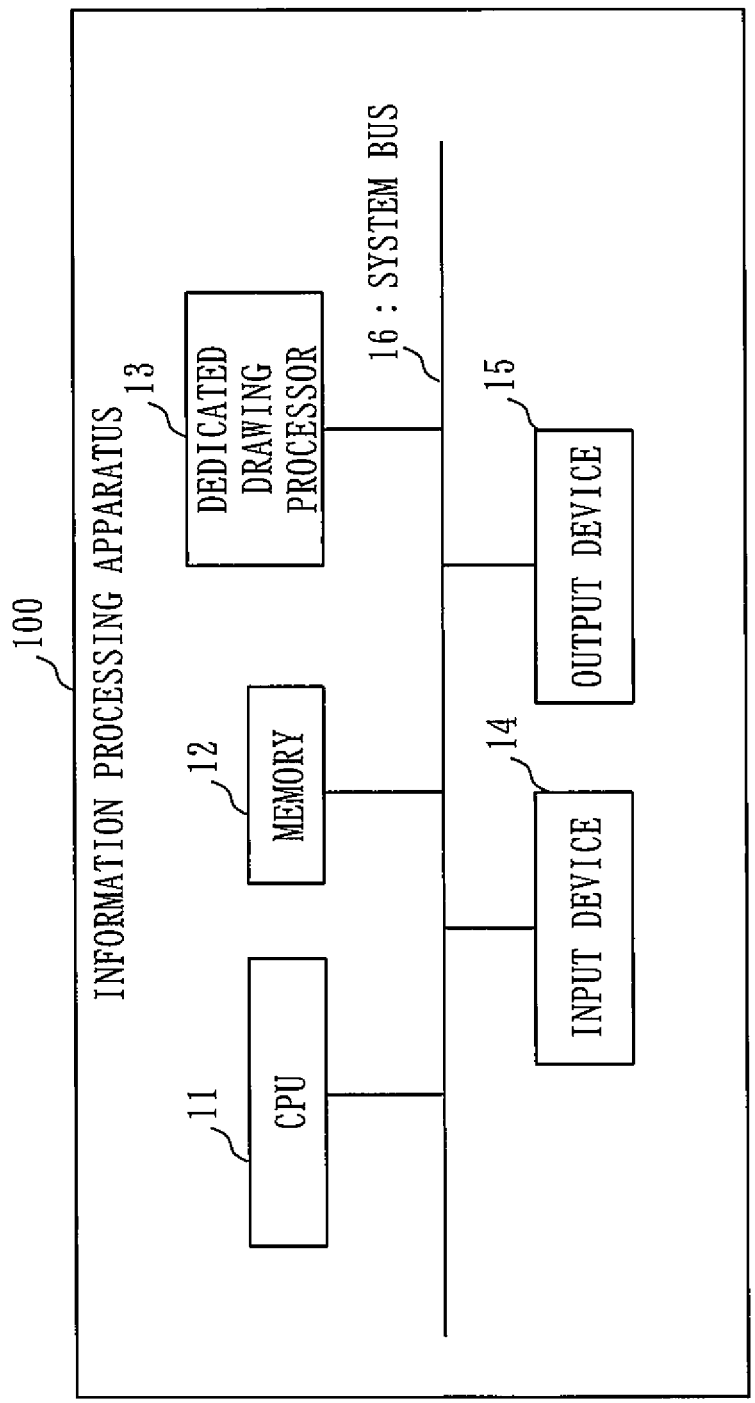
FIG. 1 is a diagram illustrating an example of a hardware configuration of an information processing apparatus according to Embodiment 1.

FIG. 1 illustrates an example of a hardware configuration of an information processing apparatus 100 according to this embodiment.

The hardware configuration in FIG. 1 is an example, and various configurations may be employed according to the use or purpose.

The information processing apparatus 100 is constituted by connection of a CPU 11, a memory 12, a dedicated drawing processor 13, an input device 14, and an output device 15 through a system bus 16.

The information processing apparatus 100 is a computer.

The CPU 11 and the dedicated drawing processor 13 are each a processor to execute a program.

The memory 12 is a RAM (Random Access Memory), a ROM (Read Only Memory), a flash memory, or an HDD (Hard Disk Drive), for example.

The input device 14 is a mouse, a keyboard, or a touch panel, for example.

The output device 15 is a display such as an LCD (Liquid Crystal Display), for example.

A program to implement a function of each of an analysis unit 102 and a moving image reproduction unit 104 that will be described later is stored in the memory 12.

An OS (Operating System) is also stored in the memory 12.

The CPU 11 executes the program to implement the function of the analysis unit 102 while executing the OS.

The dedicated drawing processor 13 executes the program to implement the function of the moving image reproduction unit 104 while executing the OS.

Figure 2:
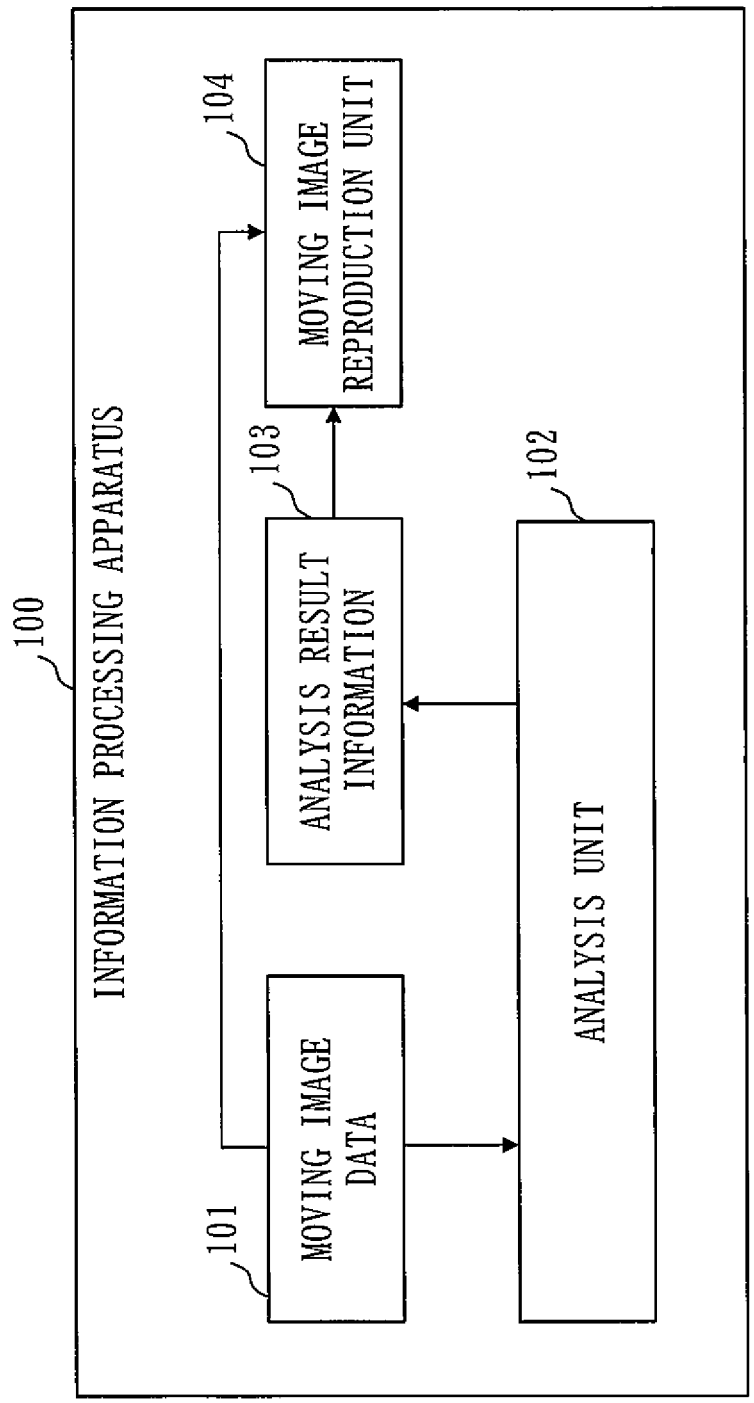
FIG. 2 is a diagram illustrating an example of a functional configuration of the information processing apparatus according to Embodiment 1.

FIG. 2 is a functional block diagram illustrating an example of a functional configuration of the information processing apparatus 100 according to this embodiment.

Moving image data 101 is stored in the memory 12, and the moving image data 101 is read into the CPU 11 from the memory 12.

Then, by execution of the program describing the processing procedure of the analysis unit 102 by the CPU 11, analysis result information 103 is generated.

The analysis result information 103 generated is stored in the memory 12.

The moving image data 101 and the analysis result information 103 are read into the dedicated drawing processor 13 from the memory 12.

Then, by execution of the program describing the processing procedure of the moving image reproduction unit 104 by the dedicated drawing processor 13, the moving image data 101 using the analysis result information 103 is reproduced.

Hereinafter, an execution of the program describing the processing procedure of the analysis unit 102 by the CPU 11 is described, as operations of the analysis unit 102.

Further, an execution of the program describing the processing procedure of the moving image reproduction unit 104 by the dedicated drawing processor 13 is described, as operations of the moving image reproduction unit 104.

Each of the analysis unit 102 and the moving image reproduction unit 104 may be provided using "circuitry".

Alternatively, each of the analysis unit 102 and the moving image reproduction unit 104 may be read as a "circuit", a "step", a "procedure", or a "process".

The "circuit" and the "circuitry" are each a concept including a plurality of types of processing circuits each being a processor, a logic IC, a GA (Gate Array), an ASIC (Application Specific Integrated Circuit), or an FPGA (Field-Programmable Gate Array).

In the moving image data 101, display contents of each frame are constituted from a combination of objects.

The moving image reproduction unit 104 generates object display information for each of a plurality of frames, using difference information for each object associated with each frame, and reproduces the moving image data 101.

More specifically, the moving image reproduction unit 104 generates, for a head frame, display object information based on the difference information indicating a difference from an initial state for each object.

On the other hand, the moving image reproduction unit 104 generates, for each frame other than the head frame, display object information based on the difference information indicating a difference from an immediately preceding frame for each object, and reproduces the moving image data 101.

As described above, the display object information is information on one or more objects to be displayed on one frame and is information in which drawing attributes of the one or more objects such as the types, the numbers, the positions, the sizes, and the colors of the one or more objects to be displayed are defined, for each frame.

The moving image reproduction unit 104 draws the one or more objects of each frame, based on the display object information generated.

When the reproduction of the moving image data 101 starts from the head frame, the moving image reproduction unit 104 generates the display object information of each frame, starting from the head frame in the order of the frames, based on the difference information.

However, in a case where the reproduction of the moving image data 101 starts from a frame other than the head frame, if the reproduction start frame from which the reproduction of a moving image starts is away from the head frame, and if the method of sequentially generating the display object information starting from the head frame based on the difference information is used, it takes time to reach the display information of the reproduction start frame.

The analysis unit 102 analyzes the difference information for each frame to determine a frame attribute that is an attribute of the frame.

Then, the analysis unit 102 outputs a determination result of the frame attribute to the moving image reproduction unit 104, as the analysis result information 103.

When the frame other than the head frame among the plurality of frames is specified as the reproduction start frame, the moving image reproduction unit 104 refers to the analysis result information 103.

Then, the moving image reproduction unit 104 extracts one of the plurality of frames, based on the frame attribute determined by the analysis unit 102.

The moving image reproduction unit 104 generates the display object information of the reproduction start frame, using the difference information of the frame extracted and the difference information of the reproduction start frame, and starts the reproduction of the moving image from the reproduction start frame.

*Description of Operations*

Figure 3:
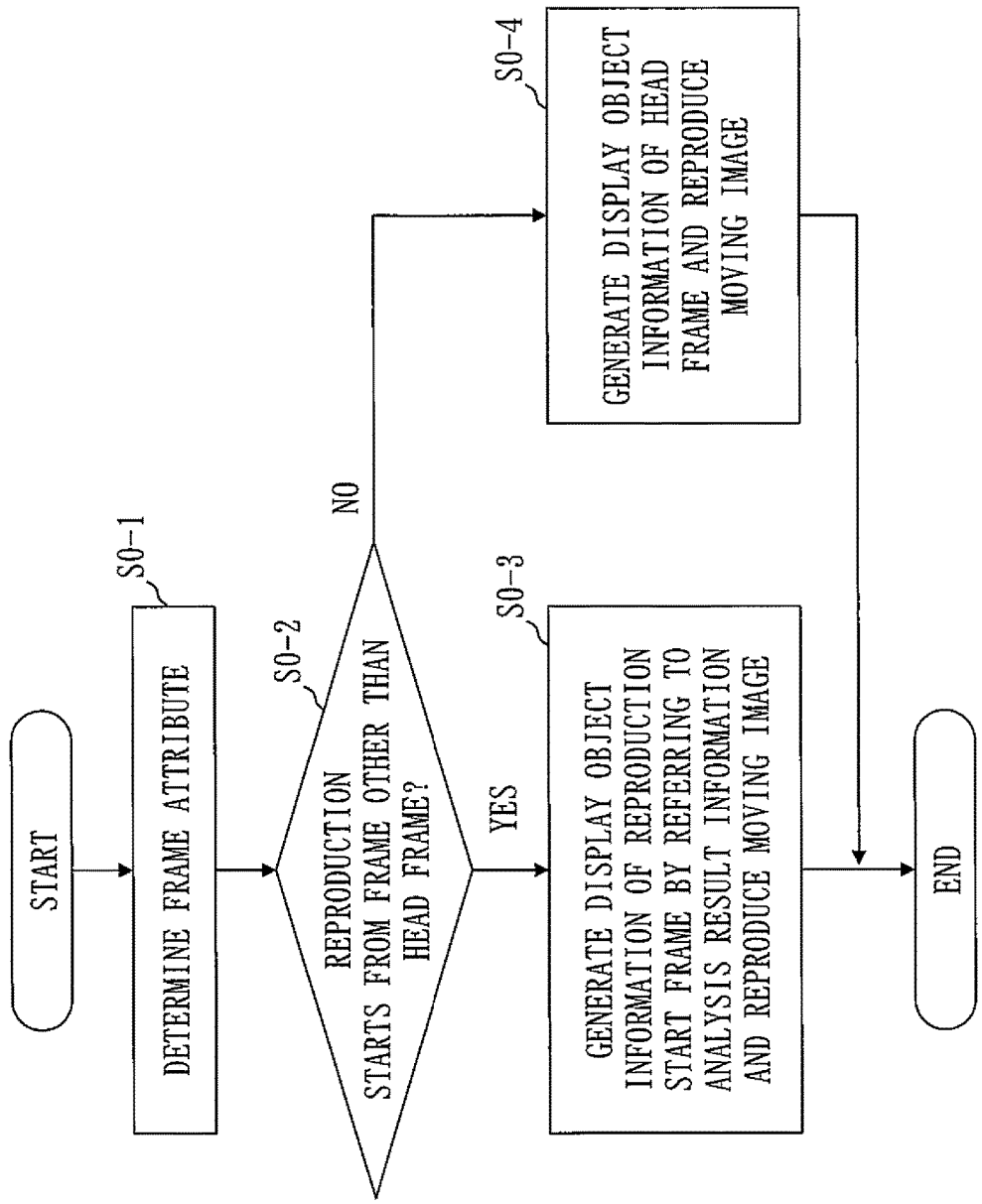
FIG. 3 is a flowchart diagram illustrating an example of operations of the information processing apparatus according to Embodiment 1.

FIG. 3 illustrates an example of operations of the information processing apparatus 100 according to this embodiment.

A procedure that will be described below corresponds to an example of each of a moving image reproduction method and a moving image reproduction program according to this application.

First, in S0-1, the analysis unit 102 analyzes difference information of each frame of the moving image data 101 to determine a frame attribute of each frame (analysis process).

A result of the analysis is output to the moving image reproduction unit 104 as the analysis result information 103.

Subsequently, if the reproduction starts from the frame other than the head frame (YES in S0-2), the moving image reproduction unit 104 refers to the analysis result information 103 in S0-3 to extract one of preceding frames preceding the reproduction start frame.

Then, the moving image reproduction unit 104 generates display object information of the reproduction start frame, using the difference information of the frame extracted and the difference information of the reproduction start frame and starts the reproduction of the moving image data 101 (moving image reproduction process).

Therefore, the moving image reproduction unit 104 may generate the display object information of the reproduction start frame more quickly and more efficiently than by sequentially generating display object information of each frame starting from the head frame to reach the reproduction start frame.

On the other hand, if the reproduction starts from the head frame (NO in S0-2), the moving image reproduction unit 104 generates display object information of the head frame and starts the reproduction of the moving image data 101.

*Description of Effect*

As mentioned above, in this embodiment, if the reproduction starts from the frame other than the head frame, the display object information of the reproduction start frame may be generated more quickly and more efficiently than by generating the display object information of the reproduction start frame starting from the head frame based on the difference information in the order of the frames.

Embodiment 2

In this embodiment, a specific example of the information processing apparatus 100 given in Embodiment 1 will be described.

In this embodiment, the analysis unit 102 determines a frame attribute for each frame.

Then, the analysis unit 102 identifies, from among a plurality of frames, a key frame having the frame attribute representing that a deletion of every object is instructed in the difference information.

Further, the analysis unit 102 generates, as the analysis result information 103, key frame information describing the key frame identified.

The moving image reproduction unit 104 refers to the key frame information and extracts the key frame from preceding frames preceding a reproduction start frame.

Then, the moving image reproduction unit 104 generates display object information of the reproduction start frame, using the difference information of the key frame extracted and difference information of the reproduction start frame.

If a plurality of the key frames are present in the preceding frames, the moving image reproduction unit 104 extracts the key frame closest to the reproduction start frame.

If an intermediate frame is present between the key frame and the reproduction start frame, the moving image reproduction unit 104 extracts the intermediate frame.

The moving image reproduction unit 104 generates the display object information of the reproduction start frame, using the difference information of the key frame, difference information of the intermediate frame, and the difference information of the reproduction start frame.

Hereinafter, a description will be directed to an animation display apparatus, as an example of the information processing apparatus 100 given in Embodiment 1. The animation display apparatus 1 displays animation data that is an example of the moving image data.

*Description of Configuration*

An example of a hardware configuration of the animation display apparatus 1 according to this embodiment is as illustrated in FIG. 1.

That is, the animation display apparatus 1 according to this embodiment is configured by connection of the CPU 11, the memory 12, the dedicated drawing processor 13, the input device 14, and the output device 15 through the system bus 16.

Figure 4:
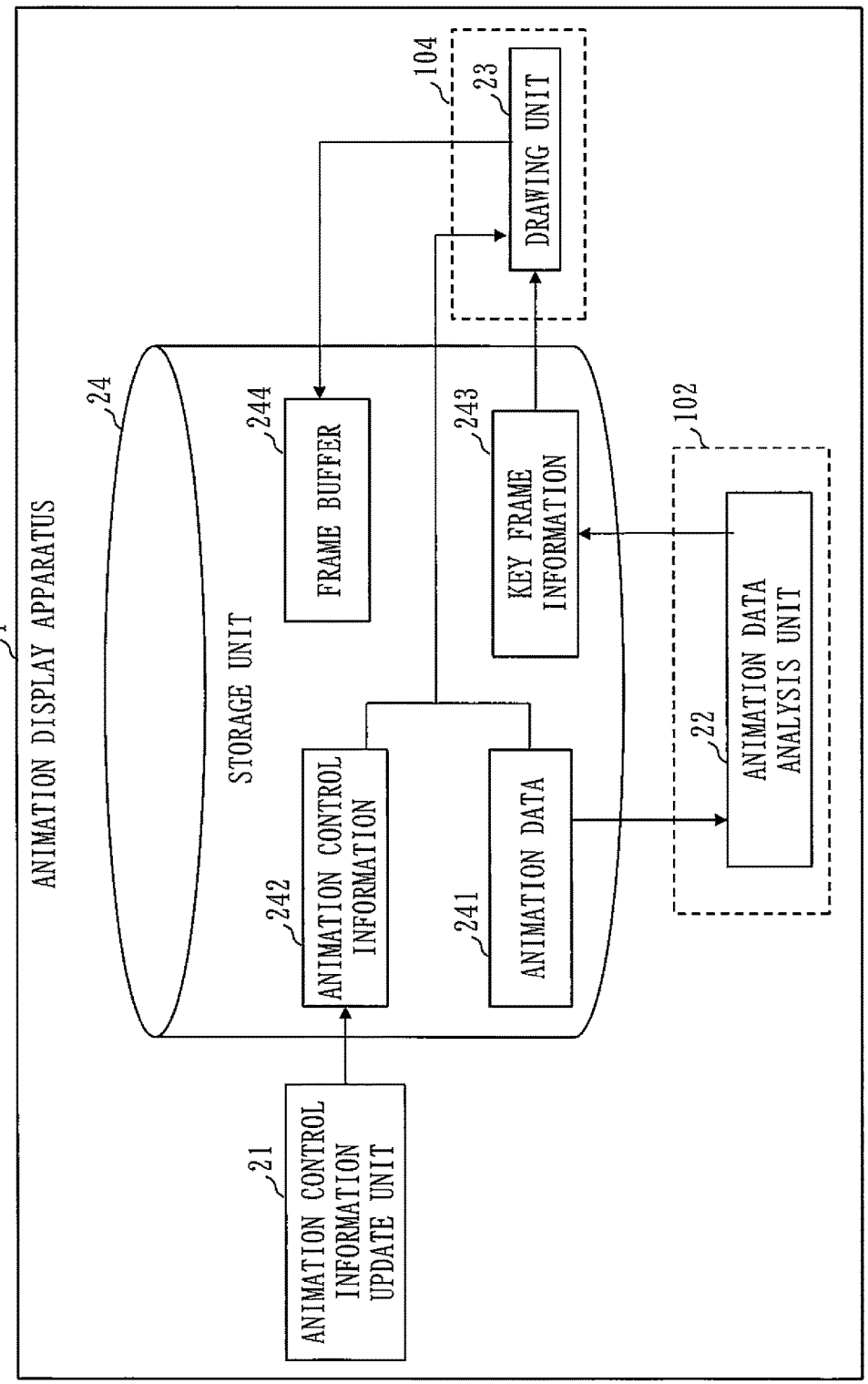
FIG. 4 is a diagram illustrating an example of a functional configuration of an animation display apparatus according to Embodiment 2.

FIG. 4 is a functional block diagram illustrating an example of a functional configuration of the animation display apparatus.

An animation control information update unit 21 and an animation data analysis unit 22 are executed by the CPU 11.

That is, a program describing the processing procedure of the animation control information update unit 21 and a program describing the processing procedure of the animation data analysis unit 22 are executed by the CPU, thereby implementing functions of the animation control information update unit 21 and the animation data analysis unit 22.

The animation data analysis unit 22 is an example of the analysis unit 102 given in Embodiment 1.

A drawing unit 23 is executed by the dedicated drawing processor 13.

That is, a program describing the processing procedure of the drawing unit 23 is executed by the dedicated drawing processor 13, thereby implementing a function of the drawing unit 23.

The drawing unit 23 is an example of the moving image reproduction unit 104 given in Embodiment 1.

Hereinafter, the execution of the program describing the processing procedure of the animation control information update unit 21 by the CPU 11 will be described as operations of the animation control information update unit 21.

Further, the execution of the program describing the processing procedure of the animation data analysis unit 22 by the CPU 11 will be described, as operations of the animation data analysis unit 22.

Further, the execution of the program describing the processing procedure of the drawing unit 23 by the dedicated drawing processor 13 will be described as operations of the drawing unit 23.

A storage unit 24 corresponds to the memory 12, and includes animation data 241, animation control information 242, key frame information 243, and a frame buffer 244.

In this embodiment, the animation data analysis unit 22 determines frame attributes of frames from a head frame to a final frame.

Then, the animation data analysis unit 22 identifies one or more key frames in which every object included in display object information of immediately preceding frames is to be deleted.

Further, the animation data analysis unit 22 generates the key frame information 243 describing the one or more key frames.

When a reproduction of the animation data 241 starts from a frame other than the head frame, the drawing unit 23 refers to the key frame information 243 to extract the key frame preceding a reproduction start frame and closest to the reproduction start frame.

The drawing unit 23 extracts an intermediate frame as well when there is the intermediate frame.

Then, the drawing unit 23 sequentially uses difference information of the key frame, difference information of the intermediate frame, and difference information of the reproduction start frame, and generates display object information of the reproduction start frame.

The drawing unit 23 applies the difference information of the key frame except for an object deletion to generate display object information of the key frame, and applies difference information to the display object information of the key frame generated to generate display object information of a subsequent frame.

The animation control information update unit 21 rewrites the animation control information 242 by an operation by a user or a communication input.

The animation control information 242 is information describing a reproduction range of animation (the reproduction start frame, a reproduction finish frame), an operation (repetition or continuing displaying the reproduction finish frame) when the reproduction finish frame has been reached, and so on.

The animation data 241 in each frame excluding the head frame is all constituted from difference information from an immediately preceding frame.

That is, only a first frame t is basic frame data, and each of second and subsequent frames is all difference frame data.

The basic frame data includes difference information indicating a difference from an initial state (in which no object is present) for each object.

The difference frame data includes the difference information indicating, for each object, a difference from the immediately preceding frame.

An example of each command constituting the difference information is illustrated in FIG. 5.

By specifying, for each object, the command illustrated in FIG. 5 in the difference information, the animation is expressed.

A plurality of the commands may be specified in one frame.

Parameters of an object that may be modified by a MOD command include the position, the size, and so on of the object.

Figure 6:
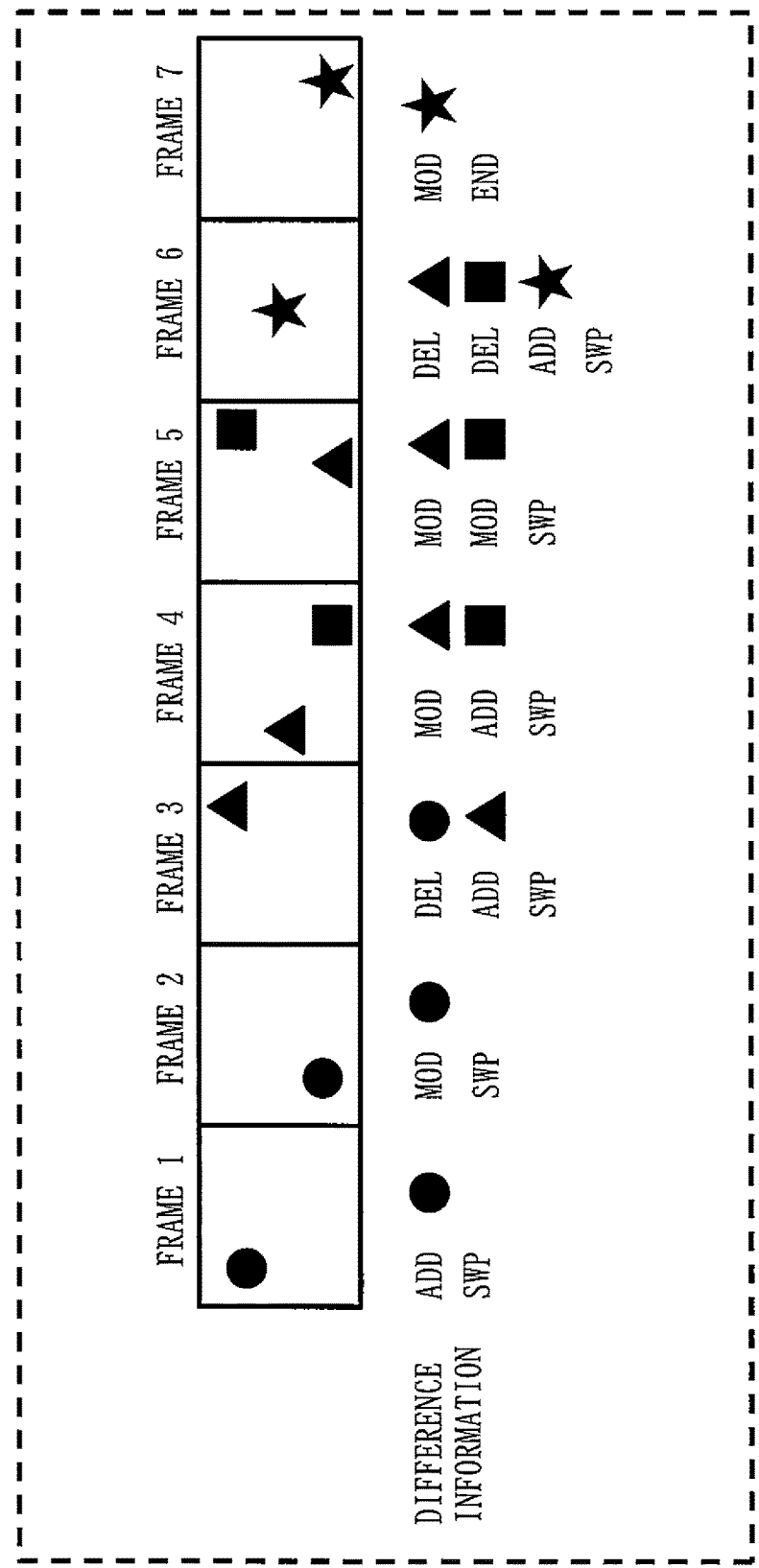
FIG. 6 is a diagram illustrating an example of animation data according to Embodiment 2.

FIG. 6 describes the animation data 241.

Referring to FIG. 6, a circular object is added by an ADD command in a frame 1.

The circular object is moved by the MOD command in a frame 2.

The circular object is deleted by a DEL command and a triangular object is newly added by the ADD command in a frame 3.

The difference information of each frame is defined by such a sequence of the commands.

Any format of the difference information may be used if an addition or a deletion of each object may be represented.

The animation data analysis unit 22 analyzes the difference information of the animation data 241 to extract one or more frames in which every object displayed in immediately preceding frames is to be deleted.

The one or more frames extracted by the animation data analysis unit 22 are each the key frame.

The animation data analysis unit 22 stores the frame number of the key frame in the key frame information 243.

Figure 7:
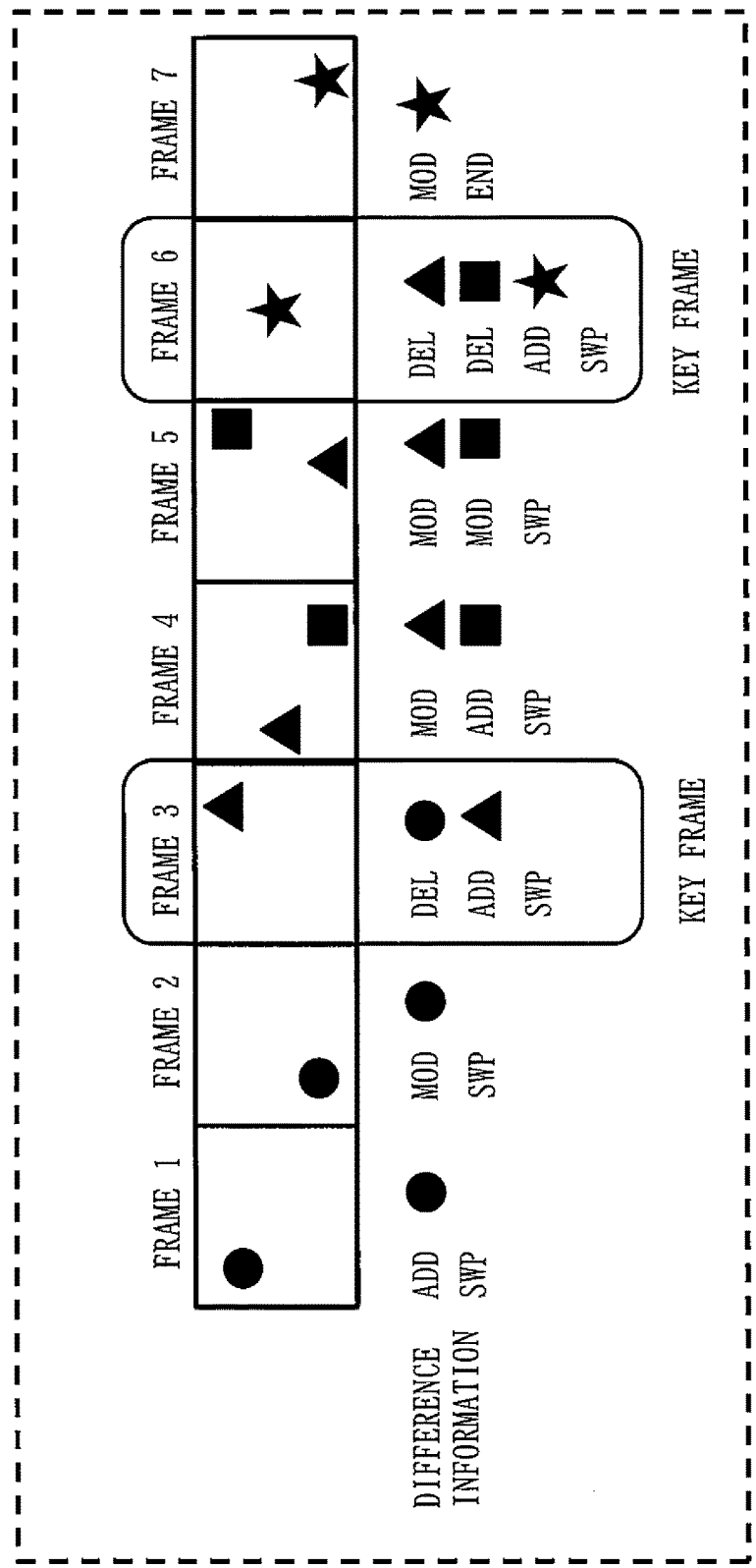
FIG. 7 is a diagram illustrating examples of key frames according to Embodiment 2.

The key frames in the animation data 241 in FIG. 6 are illustrated in FIG. 7.

Referring to FIG. 7, the frame 3 and a frame 6 are the key frames.

The key frame does not need to be the frame in which no object is present.

The frame in which every object included in display object information of an immediately preceding frame is to be deleted and a new object is to be added to display object information is also the key frame.

The process of the animation data analysis unit 22 is performed once for each animation data 241.

The drawing unit 23 constructs display object information, using the animation data 241 and the animation control information 242 to draw one or more objects in the frame buffer 244 based on the display object information.

Usually, the display object information is constructed by reflecting only the difference information from an immediately preceding frame.

However, when the animation reproduction range is changed by the animation control information update unit 21, or when a reproduction start frame is not a head frame in a case of repetitive reproduction of animation, display object information of the reproduction start frame needs to be constructed.

In this case, the drawing unit 23 refers to the number of the key frame closest to the reproduction start frame, using the key frame information 243.

Then, the drawing unit 23 generates display object information of the key frame by applying one or more of the commands excluding the DEL out of the difference information of the key frame having the corresponding key frame number.

Further, the drawing unit 23 generates display object information of a subsequent frame by applying the difference information of the subsequent frame to the display object information of the key frame generated, and then repeats similar processes to generate the display object information of the reproduction start frame.

When no key frame is present before the reproduction start frame, the display object information of the reproduction start frame is generated by sequentially reflecting the difference information starting from the head frame.

When a frame 5 is specified as the reproduction start frame in FIG. 7, the drawing unit 23 uses the frame 3 that precedes the frame 5 and is the key frame closest to the frame 5.

The drawing unit 23 ADDs (adds) the triangular object to an initial state (where no object is present) based on the difference information of the frame 3 to generate display object information of the frame 3.

Subsequently, the drawing unit 23 MODs (modifies the position of) the triangular object and ADDs (adds) a square object to the display object information of the frame 3, based on the difference information of the frame 4 to generate display object information of the frame 4.

Then, the drawing unit 23 MODs (modifies the position of) the triangular object and MODs (modifies the position of) the square object in the display object information of the frame 4, based on the difference information of the frame 5 to generate display object information of the frame 5.

The display object information is generated starting from the key frame in this way. Thus, the display object information of the reproduction start frame may be reached, using a smaller number of the display object information than by a method of generating the display object information starting from the frame 1.

*Description of Operations*

Figure 8:
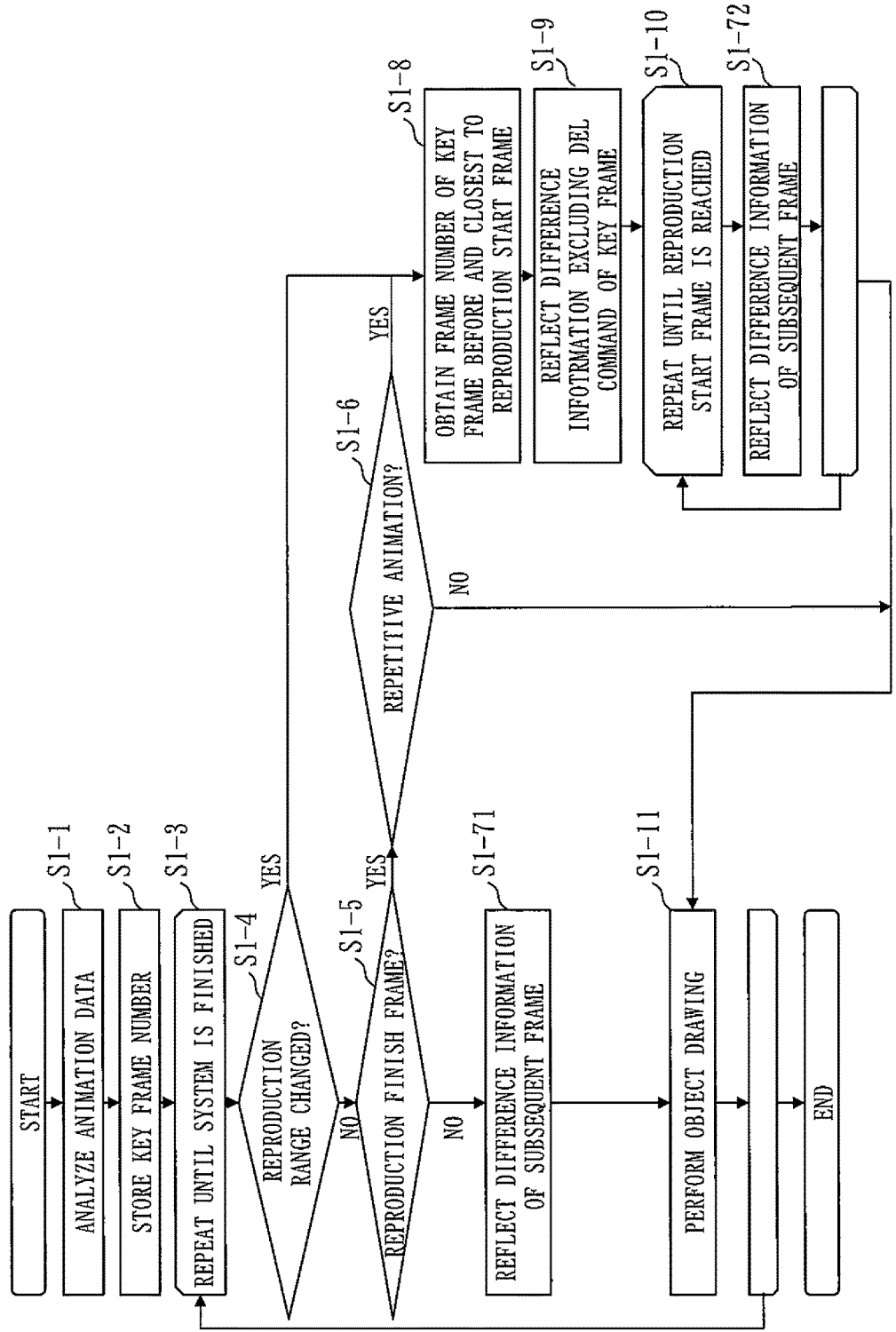
FIG. 8 is a flowchart diagram illustrating an example of operations of the animation display apparatus according to Embodiment 2.

FIG. 8 is a flowchart illustrating an example of operations of the animation display apparatus 1 according to this embodiment.

First, in S1-1, the animation data analysis unit 22 analyzes the animation data 241 to find one or more key frames.

Then, in S1-2, the animation data analysis unit 22 stores the frame numbers of the one or more key frames found in S1-1 in the key frame information 243.

Subsequently, in S1-3, the drawing unit 23 repetitively executes processes (S1-4 to S1-11) until the system is finished.

Then, in S1-4, the drawing unit 23 checks whether or not the reproduction range of animation of the animation control information 242 has been rewritten by the animation control information update unit 21.

If the reproduction range has been rewritten, the procedure moves to a process in S1-8.

On the other hand, if the reproduction range has not been rewritten, a process in S1-5 is performed.

In S1-5, the drawing unit 23 checks whether or not a current frame is a reproduction finish frame.

If the current frame is the reproduction finish frame, a process in S1-6 is performed.

On the other hand, if the current frame is not the reproduction finish frame, a process in S1-71 is performed.

In S1-6, the drawing unit 23 checks whether the operation when the reproduction finish frame has been reached in the animation control information 242 is to be repeated.

If the operation when the reproduction finish frame has been reached is to be repeated, a process in S1-8 is performed.

On the other hand, if the operation when the reproduction finish frame has been reached is not to be repeated, a process in S1-11 is performed.

In each of S1-71 and S1-72, the drawing unit 23 reflects the difference information of a subsequent frame to update display object information.

In S1-8, the drawing unit 23 obtains from the key frame information 243 the frame number of the key frame before and closest to a reproduction start frame.

In S1-9, the drawing unit 23 reflects the difference information excluding the DEL command of the frame obtained in S1-8 to update display object information.

In S1-10, the drawing unit 23 performs the process in S1-72 until the reproduction start frame is reached.

In S1-11, the drawing unit 23 performs drawing in the frame buffer 244, based on the display object information.

Then, the processes after S1-4 are repetitively performed until the system is finished.

*Description of Effects*

As mentioned above, in this embodiment, the animation data analysis unit 22 finds the one or more key frames using the different information of the animation data 241. The drawing unit 23 may thereby start generation of display object information from the key frame before and closest to a specific frame in a situation where the display object information of the specific frame is needed.

Therefore, the drawing unit 23 may generate display object information of a reproduction start frame, using a CPU load smaller than that to be used when the drawing unit 23 starts the generation of the display object information from a head frame.

The animation data in this embodiment is constituted from the difference information alone. Thus, a data size may be reduced more than by the method of incorporating a plurality of basic frame data into the animation data.

The animation data in this embodiment is all constituted from the difference information. Thus, even in normal animation reproduction in which the reproduction starts from a head frame, a CPU load for constructing display object information is reduced more than by the method of incorporating the plurality of basic frame data into the animation data.

Embodiment 3

In this embodiment, another specific example of the information processing apparatus 100 given in Embodiment 1 will be described.

In this embodiment, the analysis unit 102 determines, for each frame, the hierarchical structure of the frame as a frame attribute, and generates hierarchical structure information describing the hierarchical structure for each frame, as the analysis result information 103.

The moving image reproduction unit 104 refers to the hierarchical structure information to extract, from one or more preceding frames that precede a reproduction start frame, a same structure frame being the frame of the hierarchical structure that is the same as the hierarchical structure of the reproduction start frame.

Then, the moving image reproduction unit 104 generates display object information of the reproduction start frame, using difference information of the same structure frame extracted and difference information of the reproduction start frame.

The moving image reproduction unit 104 may extract a low-order common frame being the frame of the hierarchical structure that is the same as a hierarchical structure obtained by excluding a highest-order layer from the hierarchical structure of the reproduction start frame.

When the low-order common frame is extracted, the moving image reproduction unit 104 generates the display object information of the reproduction start frame, using the difference information of the same structure frame, difference information of the low-order common frame, and the difference information of the reproduction start frame in the order of the frames.

The moving image reproduction unit 104 may extract an earliest frame (display target object definition frame) of the frames of the hierarchical structures different from the hierarchical structure of the reproduction start frame, in which an addition or a parameter change of a display target object included in the display object information of the reproduction start frame is to be performed.

Then, when the display target object definition frame is extracted, the moving image reproduction unit 104 generates the display object information of the reproduction start frame, using the difference information of the same structure frame, the difference information of the low-order common frame, difference information of the display target object definition frame, and the difference information of the reproduction start frame in the order of the frames.

Hereinafter, a description will be directed to an animation display apparatus, as an example of the information processing apparatus 100 given in Embodiment 1. The animation display apparatus 1 displays animation data that is an example of the moving image data.

*Description of Configuration*

Figure 9:
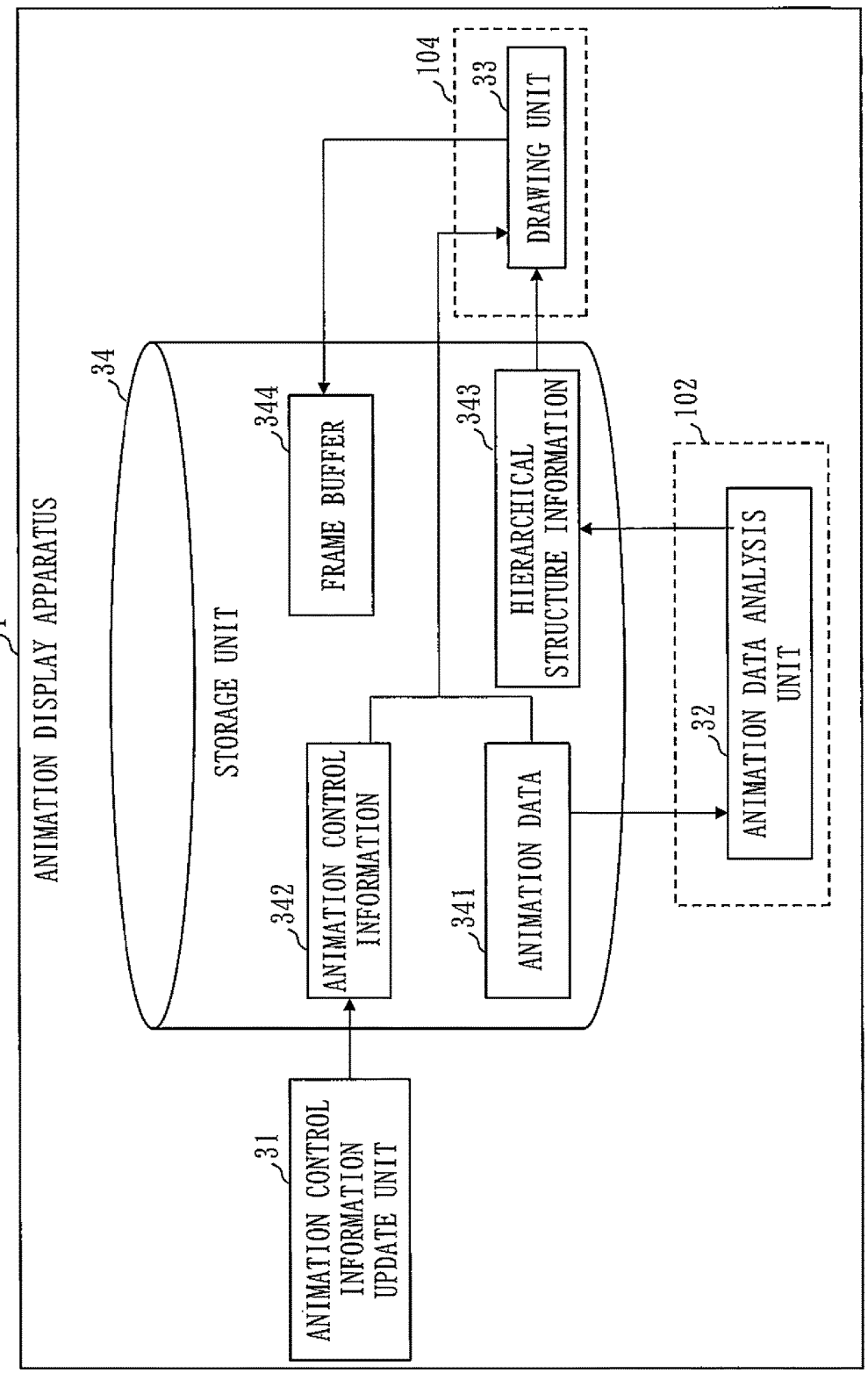
FIG. 9 is a diagram illustrating an example of a functional configuration of an animation display apparatus according to Embodiment 3.

FIG. 9 is a functional block diagram illustrating an example of a functional configuration of the animation display apparatus 1 according to Embodiment 3.

In FIG. 9, an animation data analysis unit 32 generates hierarchical structure information 343 instead of the key frame information 243, which is different from Embodiment 2.

A drawing unit 33 refers to the hierarchical structure information 343 instead of the key frame information 243, which is different from Embodiment 2.

In this embodiment as well, the animation data analysis unit 32 is an example of the analysis unit 102 given in Embodiment 1, and the drawing unit 33 is an example of the moving image reproduction unit 104 given in Embodiment 1.

The animation data analysis unit 32 defines, for each frame, a hierarchical structure, according to a hierarchy designation rule, and generates the hierarchical structure information 343 describing the hierarchical structure for each frame.

The following rules, for example, are prescribed in the hierarchy designation rule:

Rule 1:
When an object is added and is then maintained up to a final frame without a deletion or a parameter change of a preceding object preceding the object, a common layer is designated for the frames from the frame with the object added therein to the final frame.

Rule 2:
When an object is added and is then deleted without a deletion or a parameter change of a preceding object preceding the object, a common layer is designated for the frames from the frame with the object added therein to the frame immediately before the frame with the object deleted therefrom.

Rule 3:
A lower-order layer is designated for an object that is added earlier.

Rule 4:
When a plurality of objects are simultaneously added, a higher-order layer is designated for an object that is deleted earlier.

Rule 5:
When a plurality of objects are simultaneously added and then simultaneously deleted, a common layer is designated for the frames from the frame with the plurality of objects added therein and to the frame immediately before the frame with the plurality of objects deleted therefrom.

Specific examples of the rules 1 to 5 will be described later, with reference to drawings.

When starting reproduction from the frame other than a head frame, the drawing unit 33 refers to the hierarchical structure information 343 to generate display object information of the reproduction start frame.

Referring to FIG. 9, an animation control information update unit 31, animation control information 342, animation data 341, and a frame buffer 344 are the same as those illustrated in FIG. 2.

A difference from Embodiment 2 will be mainly described below.

Matters not described below are the same as those in Embodiment 2.

*Description of Operations*

Figure 10:
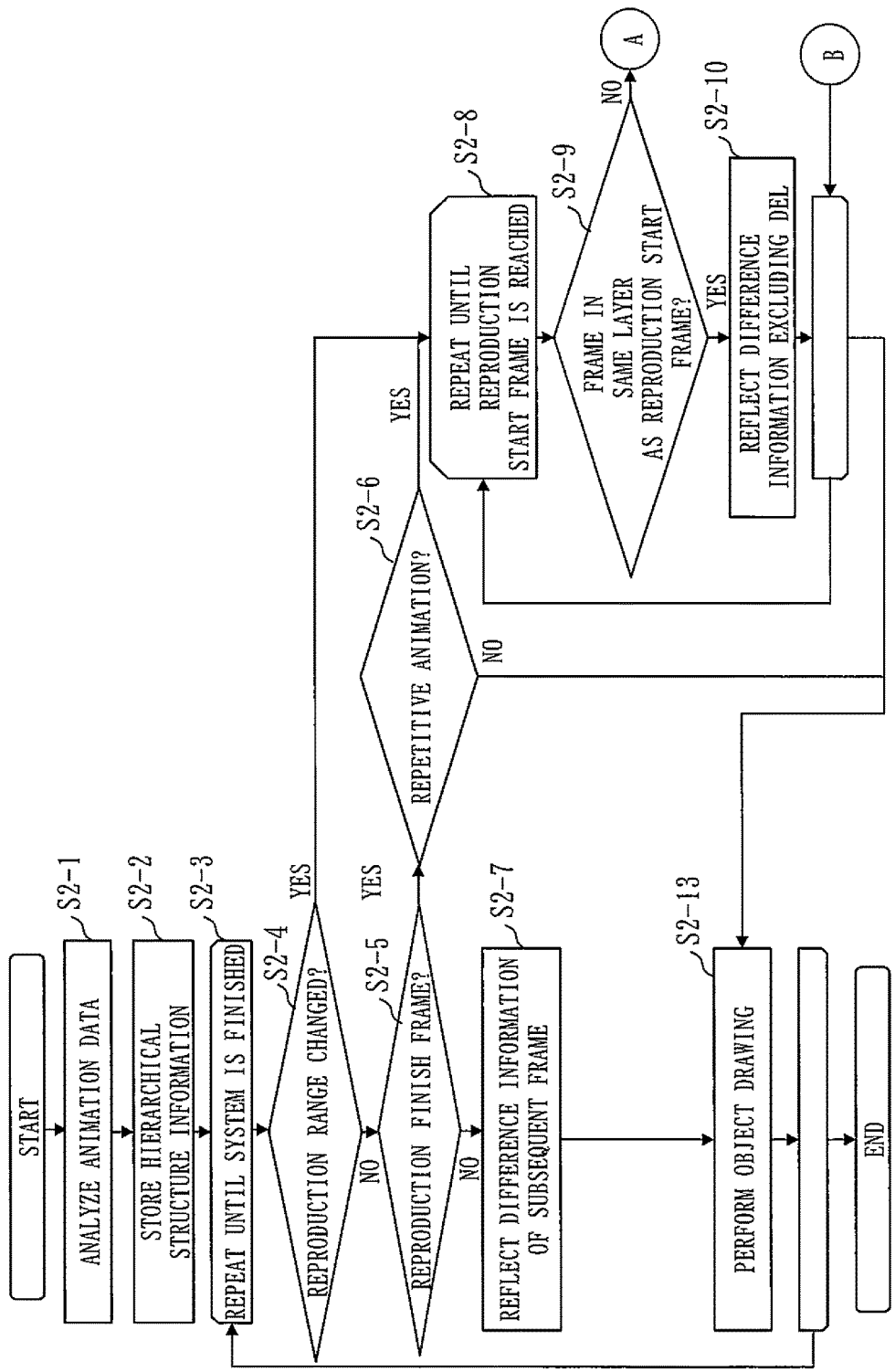
FIG. 10 is a flowchart diagram illustrating an example of operations of the animation display apparatus according to Embodiment 3.
Figure 11:
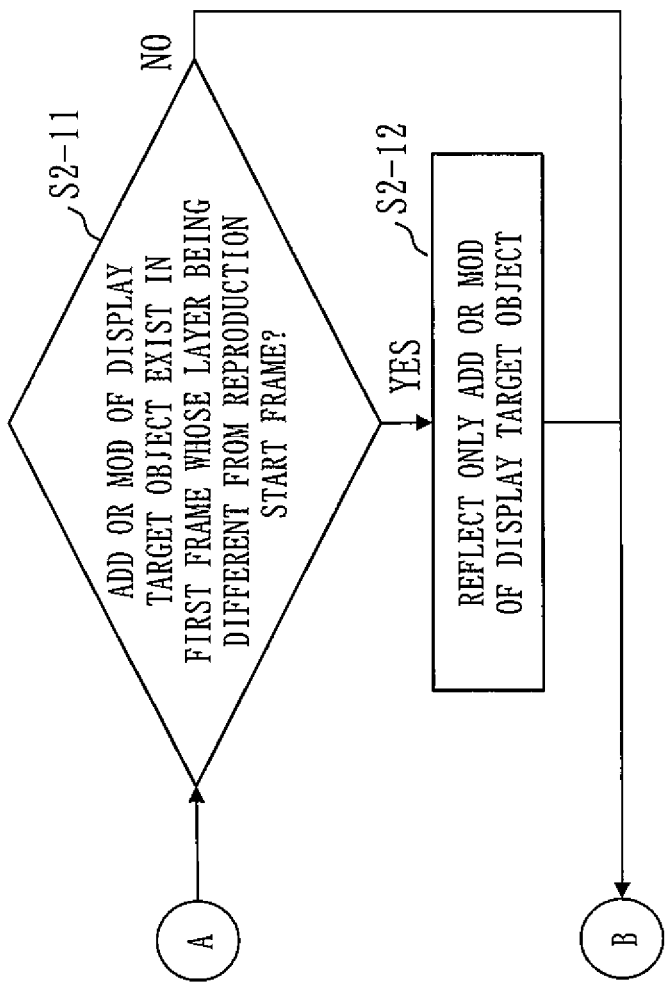
FIG. 11 is a flowchart diagram illustrating an example of operations of the animation display apparatus according to Embodiment 3.

Each of FIGS. 10 and 11 is a flowchart illustrating an example of operations of the animation display apparatus 1 according to Embodiment 3.

Processes in Embodiment 3 different from those in Embodiment 2 will be described below.

In S2-1, the animation data analysis unit 32 analyzes the status of each object in each frame of the animation data 341 to extract the hierarchical structure of the object.

Figure 12:
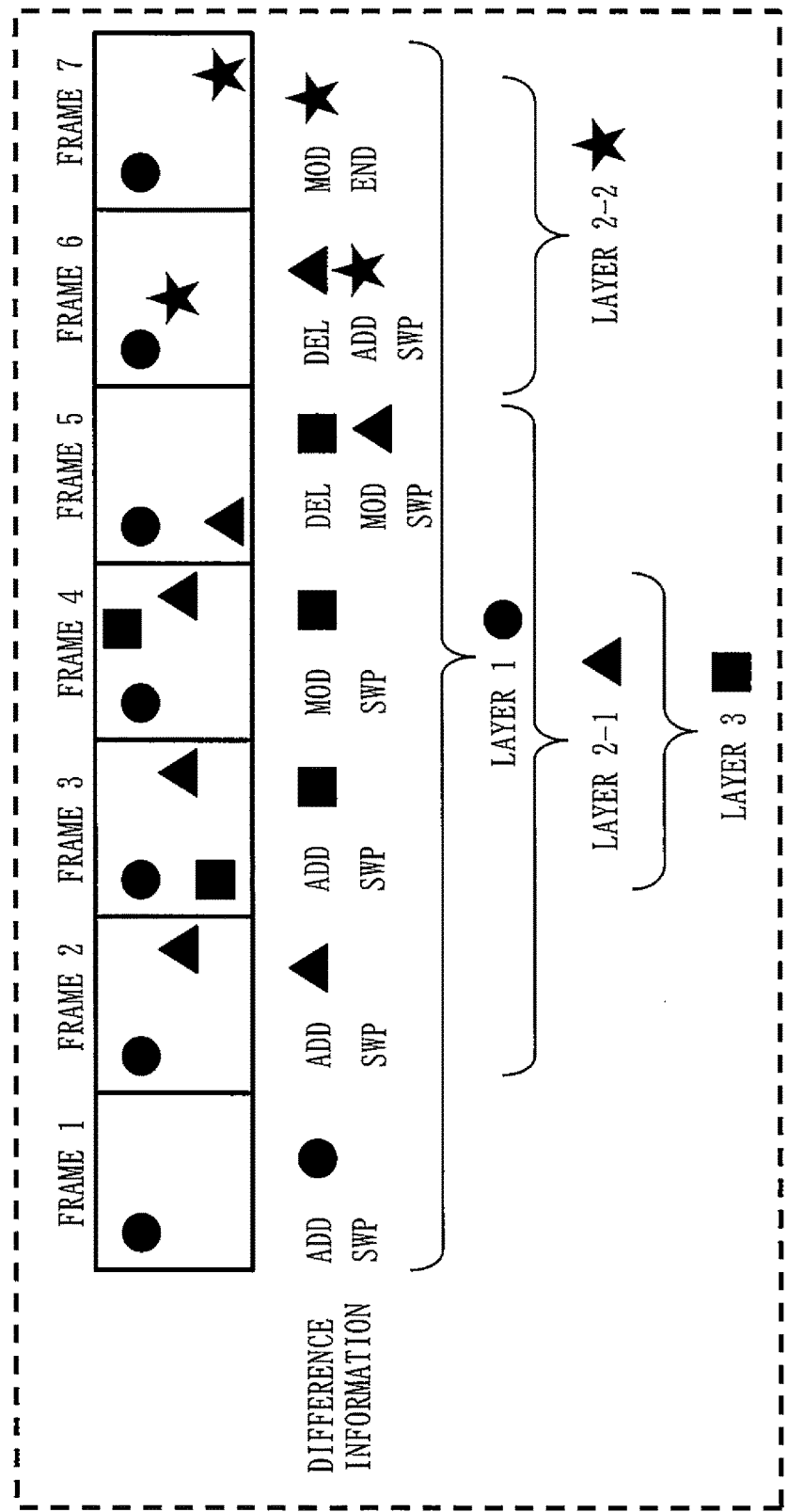
FIG. 12 is a diagram illustrating an example of a hierarchical structure of objects according to Embodiment 3.
Figure 13:
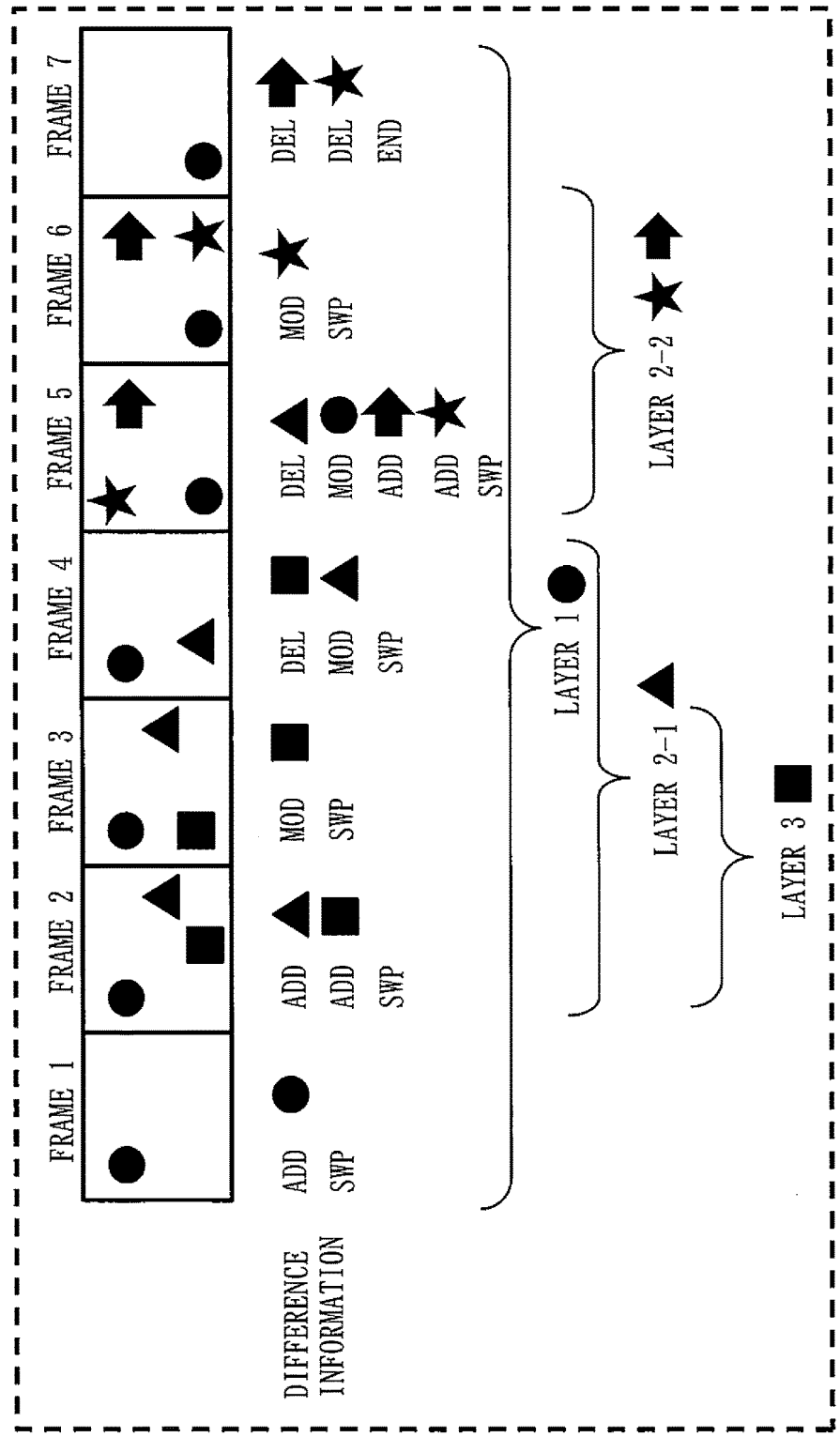
FIG. 13 is a diagram illustrating an example of a hierarchical structure of objects according to Embodiment 3.

Each of FIGS. 12 and 13 illustrates the hierarchical structure of objects in an example of the animation data.

The hierarchical structure of objects will be described, with reference to FIGS. 12 and 13.

When an object is newly added and is then maintained up to a final frame without a change (deletion or parameter change) of an object (preceding object) added in advance of the object, the object constitutes a layer (in accordance with the rule 1).

To take an example, referring to FIG. 12, a circular object is added in a frame 1, and no preceding object is present. Thus, no change occurs in the preceding object. Further, the circular object is maintained up to a frame 7 that is the final frame. Thus, this circular object constitutes a layer.

A common layer (layer 1 in FIG. 12) is designated for frames from the frame 1 with the circular object added therein to the frame 7 that is the final frame.

Only when, during a period from a new addition of an object to a deletion of the object, a change (deletion or parameter change) does not occur in an object (preceding object) added in advance of the object, the object constitutes a layer (in accordance with the rule 2).

To take an example, referring to FIG. 12, until a square object added in the frame 3 is deleted in the frame 5, no change occurs in the circular object and a triangular object that are preceding objects. Thus, this square object constitutes a layer.

A common layer (layer 3 in FIG. 12) is designated for the frames from the frame 3 with the square object added therein to the frame 4 that is a frame immediately before the frame 5 with the square object deleted therefrom.

A lower-order layer is designated for an object added earlier, while a higher-order layer is designated for an object added later (in accordance with the rule 3).

Referring to FIG. 12, the circular object is added in advance of the triangular object. Thus, the circular object belongs to the lower-order layer than the layer of the triangular object.

When a plurality of objects are simultaneously added, an object that is deleted earlier belongs to a higher-order layer (in accordance with the rule 4).

To take an example, referring to FIG. 13, a triangular object and a square object are simultaneously added in a frame 2. Since the square object is deleted earlier in a frame 4, the triangular object belongs to a lower-order layer (layer 2-1), and the square object belongs to a higher-order layer (layer 3).

When a plurality of objects are simultaneously added and are then simultaneously deleted, the plurality of objects constitute one layer (in accordance with the rule 5).

To take an example, referring to FIG. 13, an arrow object and a star object are simultaneously added in a frame 5 and the arrow object and the star object are simultaneously deleted in a frame 7. Thus, the arrow object and the star object constitute one layer.

Then, a common layer (layer 2-2 in FIG. 13) is designated for frames from the frame 5 with the arrow object and the star object added therein to a frame 6 that is a frame immediately preceding the frame 7 with the arrow object and the star object deleted therefrom.

Returning to FIG. 10, in S2-2, the animation data analysis unit 32 stores, in the hierarchical structure information 343, the hierarchical structure determined in S2-1.

In S2-8 to S2-12, the drawing unit 33 constructs display object information of a reproduction start frame, based on the hierarchical structure information 343.

In S2-8, processes in S2-9 to S2-12 are repetitively performed until the reproduction start frame is reached from a head frame.

In S2-9, the drawing unit 33 determines whether a current frame is a frame belonging to one or more layers of the reproduction start frame.

If the current frame belongs to the one or more layers of the reproduction start frame, a process in S2-10 is performed.

On the other hand, if the current frame belongs to none of the layers of the reproduction start frame, a process in S2-11 is performed.

Assume that the frame 7 in FIG. 12 is specified as the reproduction start frame and display object information of the frame 7 is constructed, for example.

In this case, the frame 7 belongs to the layer 1 and a layer 2-2, and the circular object in the layer 1 and a star object in the layer 2-2 are display target objects.

The drawing unit 33 determines that each of the frame 1 and the frame 6 to be the frame belonging to the one or more layers of the frame 7 (reproduction start frame).

The frame 1 is the frame of the hierarchical structure being the same as that of the layer (i.e., the layer 1) excluding the layer 2-2 which is the highest-order layer of the frame 7, and corresponds to the low-order common frame of the frame 7.

The frame 6 is the frame of the hierarchical structure being is the same as that of the frame 7, and corresponds to the same structure frame of the frame 7.

Since each of the frame 2 and the frame 5 belongs to the layer 1 and a layer 2-1, the layers of each of the frame 2 and the frame 5 are different from the layers of the frame 7.

Similarly, since each of the frame 3 and the frame 4 belongs to the layer 1, the layer 2-1, and the layer 3, the layers of each of the frame 3 and the frame 4 are different from the layers of the frame 7.

In S2-10, the drawing unit 33 performs display object information generation, based on difference information excluding the DEL of the frame determined to belong to the one or more layers of the reproduction start frame in S2-9.

Since no object in a different layer is added, the DEL is insignificant and does not need to be executed.

In S2-11, the drawing unit 33 determines whether the current frame is a first frame of the frames that do not belong to the one or more layers of the reproduction start frame.

If the current frame is the first frame of the frames that do not belong to the one or more layers of the reproduction start frame, the drawing unit 33 checks whether the ADD or the MOD of an object (display target object) included in the display object information of the reproduction start frame is present in difference information of the frame.

If the ADD or the MOD of the display target object is present in the difference information, a process in S2-12 is performed.

To take an example, when display object information of the frame 4 in FIG. 13 is constructed, the ADD of the triangular object in the frame 2 corresponds to the ADD of the display target object.

The frame 4 belongs to a layer 1 and the layer 2-1, and the frame 2 belongs to the layer 1, the layer 2-1, and the layer 3. Thus, the hierarchical structure of the frame 4 and the hierarchical structure of the frame 2 are different.

Then, the frame 2 is the first frame of the frames of the hierarchical structures different from the hierarchical structure of the frame 4.

The ADD of the triangular object included in the frame 4 is present in difference information of the frame 2.

When display object information of the frame 7 is constructed, the MOD of a circular object in the frame 5 corresponds to the MOD of the display target object.

The frame 7 belongs to the layer 1, and the frame 5 belongs to the layer 1 and the layer 2-2. Thus, the hierarchical structure of the frame 7 and the hierarchical structure of the frame 5 are different.

Then, the frame 5 is the first frame of the frames of the hierarchical structures different from the hierarchical structure of the frame 7.

The MOD of the circular object included in the frame 7 is present in difference information of the frame 5.

The frame 2 corresponds to the display target object definition frame of the frame 4, and the frame 5 corresponds to the display target object definition frame of the frame 7.

When an object in a high-order layer and an object in a low-order layer are simultaneously added, the ADD of the display target objects is generated.

When an addition of an object in a high-order layer and a change of a parameter in a low-order layer are simultaneously performed, the MOD of the display target object is generated.

The determination in S2-11 may be entirely made by the drawing unit 33. Alternatively, the animation data analysis unit 32 may extract a target frame in advance, and may include, in the hierarchical structure information 343, information on the target frame.

In S2-12, the drawing unit 33 reflects only the ADD or the MOD of the object extracted in S2-11 in a corresponding frame.

In the example in FIG. 13, the drawing unit 33 generates display object information in which only the ADD of the triangular object in the difference information of the frame 2 is reflected in display object information of a frame 1 in order to generate the display object information of the frame 4.

The drawing unit 33 generates display object information in which only the MOD of the circular object in the difference information of the frame 5 is reflected in the display object information of the frame 1 in order to generate the display object information of the frame 7.

\*\*\*Description of Effects\*\*\*

As mentioned above, in this embodiment, the animation data analysis unit 32 finds out the hierarchical structure for each object, using the difference information of the animation data 341. In a situation where the display object information of a specific frame is needed, the drawing unit 33 may thereby reflect the difference information of only the display target object and may construct the display object information, using a CPU load smaller than that to be used when the drawing unit 23 reflects all the difference information starting from a head frame.

The animation data in this embodiment is constituted from the difference information alone. Thus, a data size may be reduced more than by the method of incorporating a plurality of basic frame data into the animation data.

The animation data in this embodiment is all constituted from the difference information. Thus, even in normal animation reproduction in which the reproduction starts from a head frame, a CPU load for constructing display object information is reduced more than by the method of incorporating the plurality of basic frame data into the animation data.

The above description has been given about the embodiments of the present invention. Two or more of these embodiments may be combined to be carried out.

Alternatively, one of these embodiments may be partially carried out.

Alternatively, two or more of these embodiments may be partially combined to be carried out.

The present invention is not limited to these embodiments, and various modifications are possible as necessary.

REFERENCE SIGNS LIST

1: animation display apparatus; 11: CPU; 12: memory; 13: dedicated drawing processor 14: input device; 15: output device; 16: system bus; 21: animation control information update unit; 22: animation data analysis unit; 23: drawing unit; 24: storage unit; 31: animation control information update unit; 32: animation data analysis unit; 33: drawing unit; 34: storage unit, 100: information processing apparatus, 101: moving image data, 102: analysis unit, 103: analysis result information; 104: moving image reproduction unit; 241: animation data; 242: animation control information; 243: key frame information; 244: frame buffer; 341: animation data; 342: animation control information; 343: hierarchical structure information; 344: frame buffer

The invention claimed is:

1. An information processing apparatus comprising:
processing circuitry to:
generate display object information for each of a plurality of frames, using difference information for each object associated with each frame and to reproduce a moving image; and
analyze difference information for each frame and determine a frame attribute that is an attribute of the frame;
wherein when a frame other than a head frame of the plurality of frames is specified as a reproduction start frame from which a reproduction of the moving image starts, the processing circuitry extracts one of the plurality of frames based on the frame attribute determined, generates the display object information of the reproduction start frame, using the difference information of the frame extracted and the difference information of the reproduction start frame, and starts the reproduction of the moving image from the reproduction start frame
wherein the processing circuitry determines the frame attribute for each frame, identifies, from among the plurality of frames, a key frame having the frame attribute representing that a deletion of every object is instructed in the difference information, and generates key frame information describing the key frame identified; and
wherein the processing circuitry refers to the key frame information, extracts the key frame from among one or more preceding frames preceding the reproduction start frame, and generates the display object information of the reproduction start frame, using the difference information of the key frame extracted and the difference information of the reproduction start frame.

2. The information processing apparatus according to claim 1,
wherein the processing circuitry extracts the key frame from among the one or more preceding frames preceding the reproduction start frame and extracts an intermediate frame that is present between the key frame extracted and the reproduction start frame, and generates the display object information of the reproduction start frame, using the difference information of the key frame extracted, the difference information of the intermediate frame extracted, and the difference information of the reproduction start frame in an order of the key frame extracted, the intermediate frame extracted, and the reproduction start frame.

3. The information processing apparatus according to claim 2,
wherein the processing circuitry applies the difference information of the extracted key frame except for an object deletion to generate the display object information of the key frame, and uses the difference information of a frame subsequent to the key frame and the display object information of the key frame in said order of the frames to generate the display object information of the frame subsequent to the key frame.

4. The information processing apparatus according to claim 1,
wherein when a plurality of key frames are present in the one or more preceding frames, the processing circuitry extracts the key frame closest to the reproduction start frame.

5. The information processing apparatus according to claim 1,
wherein the processing circuitry applies the difference information of the extracted key frame except for an object deletion to generate the display object information of the key frame, and uses the difference information of the reproduction start frame and the display object information of the key frame to generate the display object information of the reproduction start frame.

6. A moving image reproduction method by a computer which generates display object information for each of a plurality of frames, using difference information for each object associated with each frame and reproduces a moving image, the method comprising:
analyzing difference information for each frame and determining a frame attribute that is an attribute of the frame; and
extracting, when a frame other than a head frame of the plurality of frames is specified as a reproduction start frame from which a reproduction of the moving image starts, one of the plurality of frames based on the frame attribute, generating the display object information of the reproduction start frame, using the difference information of the frame extracted and the difference information of the reproduction start frame, and starting the reproduction of the moving image from the reproduction start frame, wherein the processing circuitry determines the frame attribute for each frame, identifies, from among the plurality of frames, a key frame having the frame attribute representing that a deletion of every object is instructed in the difference information, and generates key frame information describing the key frame identified; and wherein the processing circuitry refers to the key frame information, extracts the key frame from among one or more preceding frames preceding the reproduction start frame, and generates the display object information of the reproduction start frame, using the difference information of the key frame extracted and the difference information of the reproduction start frame.

7. A non-transitory computer readable medium storing a moving image reproduction program causing a computer which generates display object information for each of a plurality of frames, using difference information for each object associated with each frame and reproduces a moving image, to execute:

an analysis process of analyzing difference information for each frame and determining a frame attribute that is an attribute of the frame; and a moving image reproduction process of extracting, when a frame other than a head frame of the plurality of frames is specified as a reproduction start frame from which a reproduction of the moving image starts, one of the plurality of frames based on the frame attribute determined in the analysis process, generating the display object information of the reproduction start frame, using the difference information of the frame extracted and the difference information of the reproduction start frame, and starting the reproduction of the moving image from the reproduction start frame, wherein the processing circuitry determines the frame attribute for each frame, identifies, from among the plurality of frames, a key frame having the frame attribute representing that a deletion of every object is instructed in the difference information, and generates key frame information describing the key frame identified; and wherein the processing circuitry refers to the key frame information, extracts the key frame from among one or more preceding frames preceding the reproduction start frame, and generates the display object information of the reproduction start frame, using the difference information of the key frame extracted and the difference information of the reproduction start frame.

8. An information processing apparatus comprising:
processing circuitry to:
generate display object information for each of a plurality of frames, using difference information for each object associated with each frame and to reproduce a moving image; and
analyze difference information for each frame and determine a frame attribute that is an attribute of the frame;
wherein when a frame other than a head frame of the plurality of frames is specified as a reproduction start frame from which a reproduction of the moving image starts, the processing circuitry extracts one of the plurality of frames based on the frame attribute determined, generates the display object information of the reproduction start frame, using the difference information of the frame extracted and the difference information of the reproduction start frame, and starts the reproduction of the moving image from the reproduction start frame wherein the processing circuitry determines, for each frame, a hierarchical structure of the frame as the frame attribute, and generates hierarchical structure information describing the hierarchical structure for each frame; and wherein the processing circuitry refers to the hierarchical structure information to extract, from among one or more preceding frames preceding the reproduction start frame, a same structure frame being the frame of the hierarchical structure that is the same as the hierarchical structure of the reproduction start frame, and generates the display object information of the reproduction start frame, using the difference information of the same structure frame extracted and the difference information of the reproduction start frame.

9. The information processing apparatus according to claim 8, wherein the processing circuitry refers to the hierarchical structure information to extract, from among the one or more preceding frames preceding the reproduction start frame, the same structure frame and a low-order common frame being the frame of the hierarchical structure that is the same as a hierarchical structure obtained by excluding a high-order layer from the hierarchical structure of the reproduction start frame, and generates the display object information of the reproduction start frame, using the difference information of the same structure frame extracted, the difference information of the low-order common frame extracted, and the difference information of the reproduction start frame in an order of the same structure frame extracted, the low-order common frame extracted, and the reproduction start frame.

10. The information processing apparatus according to claim 9, wherein the processing circuitry applies the difference information of the same structure frame except for an object deletion to generate the display object information of the same structure frame;

applies the difference information of the low-order common frame except for an object deletion to generate the display object information of the low-order common frame; and applies the difference information of the reproduction start frame to one of the display object information of the same structure frame and the display object information of the low-order common frame to generate the display object information of the reproduction start frame.

11. The information processing apparatus according to claim 9, wherein the processing circuitry refers to the hierarchical structure information to extract the same structure frame, the low-order common frame and a display target object definition frame, the display target object definition frame being an earliest frame of the frames of the hierarchical structures different from the hierarchical structure of the reproduction start frame and being the frame in which an addition or a parameter change of a display target object included in the display object information of the reproduction start frame is to be performed; and generates the display object information of the reproduction start frame, using the difference information of the same structure frame extracted, the difference information of the low-order common frame, the difference information of the display target object definition frame, and the difference information of the reproduction start frame in said order of the frames.

12. The information processing apparatus according to claim 11,
wherein the processing circuitry applies the difference information of the same structure frame except for an object deletion to generate the display object information of the same structure frame;
applies the difference information of the low-order common frame except for an object deletion to generate the display object information of the low-order common frame;
applies only the addition or the parameter change of the display target object in the difference information of the display target object definition frame to generate the display object information of the display target object definition frame; and
applies the difference information of the reproduction start frame to one of the display object information of the same structure frame, the display object information of the low-order common frame, and the display object information of the display target object definition frame to generate the display object information of the reproduction start frame.

13. The information processing apparatus according to claim 8,
wherein the processing circuitry determines, for each frame, the hierarchical structure of the frame, according to a hierarchy designation rule prescribing that:
when an object is added and is then maintained up to a final frame of the plurality of frames without a deletion or a parameter change of a preceding object preceding the object, a common layer is designated for the frames from the frame with the object added therein to the final frame;
when an object is added and is then deleted without a deletion or a parameter change of a preceding object preceding the object, a common layer is designated for the frames from the frame with the object added therein to the frame immediately before the frame with the object deleted therefrom;
a lower-order layer is designated for an object that is added earlier than another object;
when a plurality of objects are simultaneously added, a higher-order layer is designated for an object that is deleted earlier than others of said plurality of objects; and
when a plurality of objects are simultaneously added and then simultaneously deleted, a common layer is designated for the frames from the frame with the plurality of objects added therein to the frame immediately before the frame with the plurality of objects deleted therefrom.

14. The information processing apparatus according to claim 8,
wherein the processing circuitry applies the difference information of the same structure frame except for an object deletion to generate the display object information of the same structure frame; and
applies the difference information of the reproduction start frame to the display object information of the same structure frame to generate the display object information of the reproduction start frame.

15. A moving image reproduction method by a computer which generates display object information for each of a plurality of frames, using difference information for each object associated with each frame and reproduces a moving image, the method comprising:
analyzing difference information for each frame and determining a frame attribute that is an attribute of the frame; and
extracting, when a frame other than a head frame of the plurality of frames is specified as a reproduction start frame from which a reproduction of the moving image starts, one of the plurality of frames based on the frame attribute, generating the display object information of the reproduction start frame, using the difference information of the frame extracted and the difference information of the reproduction start frame, and starting the reproduction of the moving image from the reproduction start frame,
wherein the processing circuitry determines, for each frame, a hierarchical structure of the frame as the frame attribute, and generates hierarchical structure information describing the hierarchical structure for each frame; and
wherein the processing circuitry refers to the hierarchical structure information to extract, from among one or more preceding frames preceding the reproduction start frame, a same structure frame being the frame of the hierarchical structure that is the same as the hierarchical structure of the reproduction start frame, and generates the display object information of the reproduction start frame, using the difference information of the same structure frame extracted and the difference information of the reproduction start frame.

16. A non-transitory computer readable medium storing a moving image reproduction program causing a computer which generates display object information for each of a plurality of frames, using difference information for each object associated with each frame and reproduces a moving image, to execute:
an analysis process of analyzing difference information for each frame and determining a frame attribute that is an attribute of the frame; and
a moving image reproduction process of extracting, when a frame other than a head frame of the plurality of frames is specified as a reproduction start frame from which a reproduction of the moving image starts, one of the plurality of frames based on the frame attribute determined in the analysis process, generating the display object information of the reproduction start frame, using the difference information of the frame extracted and the difference information of the reproduction start frame, and starting the reproduction of the moving image from the reproduction start frame,
wherein the processing circuitry determines, for each frame, a hierarchical structure of the frame as the frame attribute, and generates hierarchical structure information describing the hierarchical structure for each frame; and
wherein the processing circuitry refers to the hierarchical structure information to extract, from among one or more preceding frames preceding the reproduction start frame, a same structure frame being the frame of the hierarchical structure that is the same as the hierarchical structure of the reproduction start frame, and generates the display object information of the reproduction start frame, using the difference information of the same structure frame extracted and the difference information of the reproduction start frame.

\* \* \* \* \*